[redacted]

[11] 3,581,282

[72] Inventor Norman G. Altman
White Plains, N.Y.
[21] Appl. No. 780,768
[22] Filed Dec. 3, 1968
[45] Patented May 25, 1971
[73] Assignees Charles H. Lipton;
Michael Ebert
New York, N.Y., part interest to each

[54] PALM PRINT IDENTIFICATION SYSTEM
9 Claims, 3 Drawing Figs.

Figure 1:
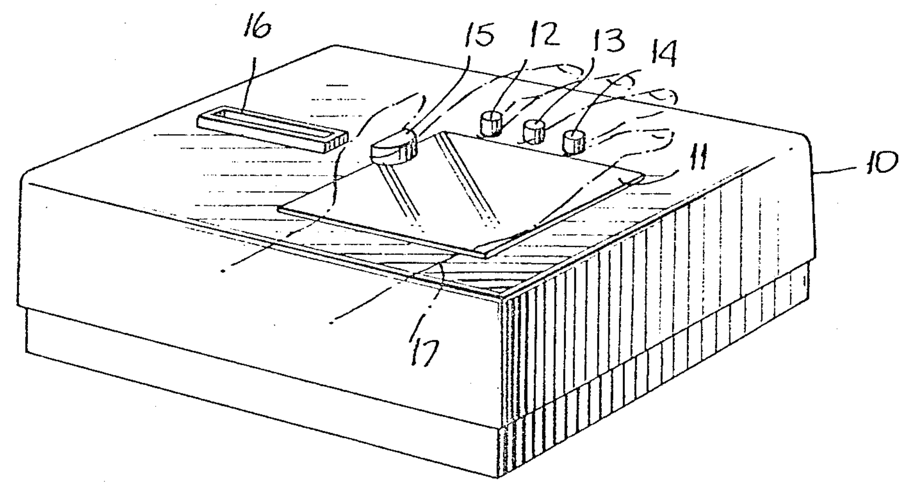

[52] U.S. Cl. .......... 340/149, 340/146.3
[51] Int. Cl. .......... G06k 9/00
[50] Field of Search .......... 340/149, 146.3

[56] References Cited
UNITED STATES PATENTS
3,231,861 1/1966 French .......... 340/149
3,383,657 5/1968 Claasen et al .......... 340/149

*Primary Examiner*—Donald J. Yusko
*Attorney*—Michael Ebert

..BSTRACT: A palm print identification system in which an image of the palm pattern is optically formed and scanned to generate a video signal which is an analog of the pattern, the signal being converted into a numerical code. Because each palm print is unique, an individual is thereby given a singular identifying code number which is an index to the pattern. The code identification may be recorded on an ID card. To verify identification, the hand is placed on a sensing unit and the ID card is inserted in a suitable card reader. The numerical code on the card is sensed and converted into an electrical signal which is compared in a correlator with the video signal derived from the scanned palm of the hand to determine the degree of correspondence therebetween and thereby establish identification.

INVENTOR.
NORMAN G. ALTMAN
BY
ATTORNEY

INVENTOR.
NORMAN G. ALTMAN

BY Michael [signature]
ATTORNEY

PALM PRINT IDENTIFICATION SYSTEM

This invention relates generally to the identification of individuals, and in particular to an automatic palm print identification system adapted to convert the pattern of a palm into an unique identifying code number.

The first scientific method of criminal identification was developed late in the nineteenth century by the French criminologist Bertillon, whose system was based on skeletal or other body characteristics. Fingerprinting, added later as a supplementary measure, has largely replaced the Bertillon system.

A fingerprint is an impression of the friction ridges formed on the skin, the print being taken of the underside of the end of a finger or the thumb. It is used for identification because the arrangement or ridge lines is thought to be singular and unchanged for each person. Most European and American countries now require that all criminals be fingerprinted. In the United States, fingerprints are also taken of members of the armed forces and of many civilian government employees, as well as by many banks and other agencies. Palm prints and footprints have also been used to a limited degree, especially for the identification of infants.

All existing techniques for identifying a person, whether based on physical descriptions, photographs, signatures, finger, foot or palm prints, entail human intelligence and judgment to establish identification. Such techniques call for a visual comparison of the identifying data with reference data. With known techniques one cannot make a rapid determination, and only fingerprint identification is positive. But even in fingerprinting, one needs the impression of all five fingers of a hand to make a reliable determination.

While studies conducted by the Federal Bureau of Investigation, among others, have demonstrated the unique, one-to-one identification of a palm print and an individual, what has been heretofore lacking is a technique for automatically reading palm prints and comparing them with reference copies to establish identity. The usual visual method which involves comparing a photograph of a palm print with a reference copy, requires a careful analysis of the pattern of palm creases and ridges, and is time-consuming and subject to error.

In view of the foregoing, the primary object of this invention is to provide an identification system based on palm prints, which is rapid, completely automatic, and which effects positive identification.

More specifically, it is an object of this invention to provide an automatic palm print identification system of the above-noted type, which makes use of a novel scanning arrangement adapted to extract and identify information from a palm print, the scanner generating an electrical signal in analog form containing the identifying data.

A significant aspect of the invention resides in the fact that use is made of a method of digitizing identifying information so that an array of numbers can be generated, which constitute a code uniquely identifying an individual by his palm print. In its simplest form, in an instrument based on the digitizing method, the digital vocabulary available for identification is in excess of $10^{13}$ separate and distinguishable number arrays which are machine-acceptable. With a relatively slight increase in complexity, the system can be made capable of generating more than $10^{30}$ distinct number arrays. An enormous vocabulary of this sort affords in excess of $10^{20}$ separate available number arrays for each member of today's population. Clearly, a system in accordance with the invention is not likely to run out of defining number arrays.

Because people can be identified by a number array, the system lends itself to the transmission of identifying data through existing communication channels. Thus one may convey identifying data through telegraph and telephone lines, but of greater importance is the fact that it is possible to communicate the data through computer interfaces. In this way, information pertinent to an individual, such as security clearance, credit data cards, and the like, is made available by a computer search employing standard computer storage and search techniques.

Briefly stated, these objects are attained in a system, wherein the image of a palm pattern is optically formed and scanned to generate a video signal which is an analog of the pattern. This signal is converted into a numerical code having a series of digits which depend on the wave pattern of the signal and, therefore, constitute an index to the palm print. The numerical code for a particular individual is recorded on a suitable card and his identification may thereafter be verified by retranslating the code number into a signal and comparing this signal with a signal derived by scanning the palm, whereby if the signals are in correspondence, the identification is established.

Figure 2:
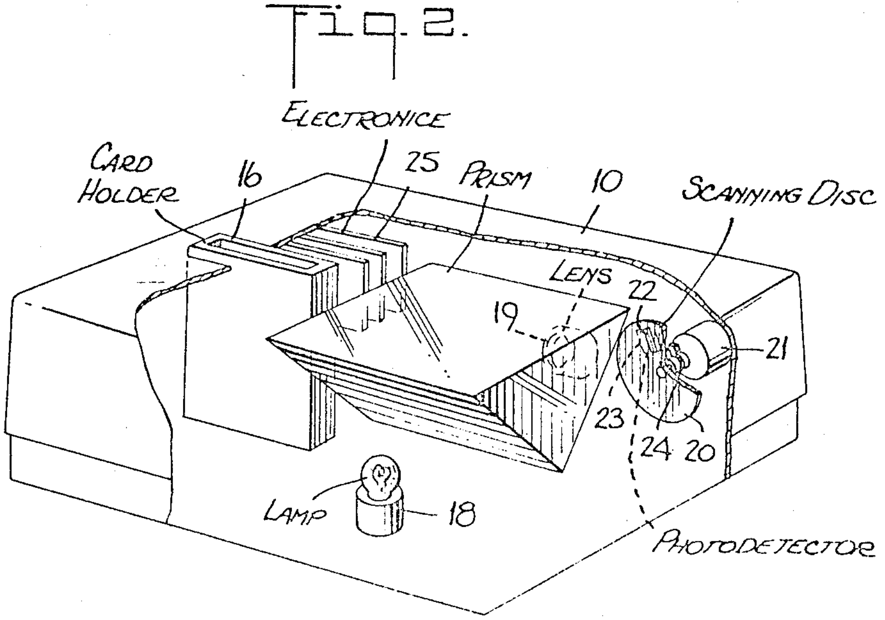
Figure 3:
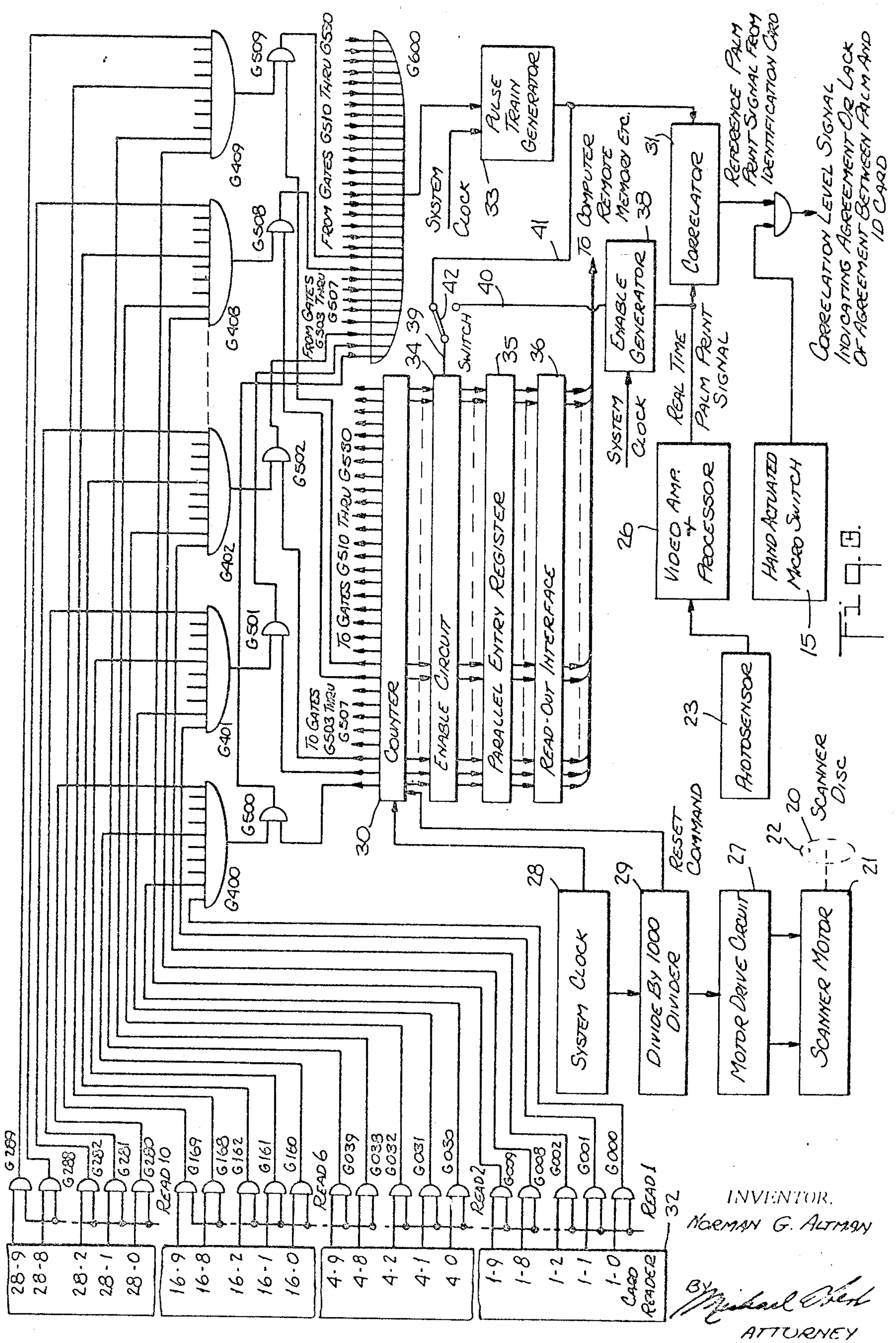

For a better understanding of the invention, reference is made to the following description to be read in connection with the drawing wherein:

FIG. 1 in perspective shows an encased palm print identifications system;

FIG. 2 shows the casing cut away to reveal the interior elements of the system, and FIG. 3 schematically illustrates the processor used in the system.

GENERAL DESCRIPTION OF PALM PRINT SYSTEM

Referring now to the drawings, and more particularly to FIGS. 1 and 2, there is shown a palm-print reader in accordance with the invention, the reader being housed in a boxlike casing 10. Mounted flush with the top wall of casing 10 is a palm register 11 whose dimensions are great enough to accommodate the usual range of hand sizes from the smallest to the largest. Adjacent the upper margin of the register is a row of three spaced guide pins 12, 13 and 14, while to the left of the register is an actuating switch 15. Also provided is a card holder 16 whose opening slot is accessible through the top wall of the casing.

To take a reading, the right hand is placed over the register, the configuration of guide pins and switch being such as to constrain the palm to a proper scanning position. As shown by the profile of hand 17 placed on register 11, the actuator switch lies within the crotch of the thumb and index finger, the guide pins being interposed between the other fingers. In this way, the placement of the palm is directly over register 11.

Register 11 is constituted by a large glass prism, the exposed surface thereof, which is engaged by the palm, being the hypotenuse of the prism. The image of the palm print is illuminated by a lamp 18 whose rays impinge on one side of the prism. The pattern of ridges and creases of the palm is formed on the other side of the prism by the principle of frustrated total internal reflection. It is to be understood that other forms of optical means may be used to produce the image of the palm print.

Lens system 19, adjacent the other side of the prism, projects the image of the palm print onto a scanning disc 20, which is rotated by a motor 21. Disc 20 is provided with a radial aperture 22, behind which is mounted a photodetector 23. The detector effects a cyclical circular scan of the image to produce a video signal which is a function thereof.

Since each palm has a unique pattern of ridges and creases, the resultant signal is likewise unique, in that by analysis of the waveform, one may identify the particular palm print. While scars, local discoloration, and other distortions have some effect on the waveform of the signals, the resultant changes are not significant in that the basic waveform of the signal is determined primarily by the overall configuration of the palm print.

The video output of detector 23 is applied to a processing circuit through suitable slip rings 24 mounted on the shaft of motor 21. The processing circuit 25 may be in printed-circuit form on panels mounted within the casing. The circuit acts to convert the signal from the detector into a numerical code, using existing digital techniques. In a practical embodiment, a 10-number code is generated that uniquely identifies an individual palm. This code can be entered onto an ID pass-card the size of a conventional credit card. Thereafter the pass-card can be used to ascertain that the bearer of the card is indeed the person to whom the card was issued.

To verify identification, the hand is placed on the register glass of the unit and the ID card placed in the slot of the holder. The numerical code on the card is then sensed and converted into an electrical signal. The palm is scanned in exactly the same fashion employed to generate the numerical code, thereby generating a video signal. The video and card signals are compared by an electronic correlator, and a yes-no answer provided to establish identity.

The palm-print system precludes misidentification of the type encountered in systems based on handwriting or photographs. With the present system, an unauthorized or counterfeit card can be fabricated only if there is access to a unit having a printout feature. For ultimate security, the ID card can be verified with a closely-guarded central file containing the identifying code numbers on a tape or other storage means. As compared to fingerprinting, the system has further advantages, for it is inkless and requires only seconds to take a reading of a palm print. Thus all of the inconveniences and psychological discomforts of fingerprinting, are obviated.

PROCESSING CIRCUIT

Referring now to FIG. 2, showing the processing circuit, it will be seen that the video signal derived from scanning photodetector 23 is applied to a video amplifier and processor 26. The motor 21 for scanning disc 20 is controlled by a drive circuit 27. The system is actuated when the individual whose palm is on the register, manually operates actuator switch 15.

The motor divider circuit is controlled by the system clock 28 whose output pulses are divided by 1000, by divider 29. The clock pulses are also applied to a counter 30 actuated by a reset command from the divider 29. Some time delay is necessary to allow motor 21 to come up to its normal operating speed. The arrangement is, therefore, made such that the counter 30 starts at zero when scanning disc 20 rotated by motor 21, is at its reference position.

Scanner 20 then examines the image of the palm which has been projected onto its face and presents the information generated by this scanning to the photodetector 23 whose output is fed to a video amplifier and processor 26. The output of the processor is a video signal in real time which defines the scanned palm print. The characteristics of this signal are such that when an identifying feature of the palm print has been found by the scanner, a meaningful leading or trailing edge of a pulse within an identifying pulse train is generated. This set of pulses with their leading and trailing edges tied to the position of the identifying characteristics of the image of the palm print as seen by the scanner is fed into one input of a correlator 31. The other input to the correlator is generated from the identification card which has been put in the card reader 32.

By way of example, we have chosen to encode the information on the card in the form of decimal numbers, that is, the code is "one out of ten." The card in this case would consist of a set of columns each of which have 10 identifiable areas in them. These areas will be given the significance of the digits 0 through 9. Thirty such columns will be used, therefore, it will be necessary for the card reader to be able to distinguish between 30 times 10 or 300 individual positions on the card. In many cases, it will be much more efficient to encode the information in binary or binary coded decimal form. However, since the most complicated to process and handle is the decimal or one out of 10 code, FIG. 2 has been made up to indicate the manner in which the one out of 10 code would be processed.

Further, the block diagram has been set up for simple AND/OR type logic. Each of the 300 outputs of the card reader are fed into one input of 300 separate "two legged" gates. These gates are divided into groups of 30 so that each three-digit number which identifies the position of one identifying mark on the palm is read out simultaneously. Thus, referring to the diagram, gates G000 through gates G029 are commanded by read command 1. Similarly, read command 2 controls gates G030 through gates G059; read command 10 controls gates G280 through gates G299.

At the beginning of a cycle, when the system is commanded by reset command, read command 1 is actuated and the outputs of the first 30 lines of card reader 32 are then enabled through gates G000 through gates G029. The output of each of these 30 gates is fed into a separate OR gate. These OR gates are numbered G400 through G429. (In the diagram only five of these OR gates are shown G400, G401, G402, and then after an appropriate space, G408 and G409). However, the extrapolation of the drawing to indicate the function of the additional 25 gates should be immediately obvious to anyone familiar with digital circuitry.

The output of each of the 10 input OR gates G400 through G429 the output of each is fed individually into one input of a set of two input AND gates G500 through G529. (Again, only five of these gates are shown but the extrapolation to understand the function and position of the other 25 gates again should be obvious to the skilled practitioner in digital circuitry).

The function of the two input AND gates G500 through G529 is to compare the number stored in the first three columns of the identification card with the lowest number generated by the counter 30. By this technique the information which is stored on the identification card in a purely digital form is converted to a pulse train with the position of the zero crossing of the pulse train corresponding to the numbers on the identification card.

The manner in which the conversion takes place once coincidence has been established between counter 30 and the outputs of the OR gates G400 through G429 as determined by AND gates G500 through G529 and the final 30 input AND gate G600 is to control pulse train generator 33 which is toggled (that is, actuated to change state) every time coincidence occurs between the stored number in the identification card and counter 30. As soon as coincidence is established and the generator 33 is toggled, the read commands are advanced so that the next set of three columns are read out from the identification card and presented to the one input of the two input AND gates G500 through G529. When the counter 30 reaches the number corresponding to the number presented to these gates, coincidence is again detected, generator 33 is again toggled and the next read command is generated. In this way, a pulse way form is generated which is presented to one input of correlator 31 to be compared with the real time palm print signal from amplifier 26.

The phase coincidence and synchronization between the two signals is guaranteed since the same system clock 28 is used to provide the reference to drive the scanner motor and also to actuate the counter. Therefore, each angular increment of the scanner motor corresponds precisely to an advance scanner motor 21 corresponds precisely to an advance in count of counter 30 and, therefore, the information extracted from the card reader and decoded by the counter 30 is in exact phase synchronism with the information being extracted from the palm print by scanning disc 20 driven by scanner motor 21.

The system correlator 31 will then compare the two signals and determine whether they have generated from the same palm print. If, indeed, correlation level is high enough a suitable indication will be given to show that the palm being scanned and the information on the identification card agree and the palm presented to the scanner is that identified by the card.

The system is also able to read out and communicate with a computer or a remote memory. At the time that coincidence is established between the card and the counter, a set of enable circuits 34, controlled by the pulse output of generator 33 fed through line 41, switch 42, transfer the information from counter 30 nondestructively to a parallel entry register 35.

The output of this register is read through a readout interface 36 through an interconnection line 37 to any external digital device with which communication is desired.

The output at readout interface 36 is in 3 digit decimal (1 out of 10) form. By techniques which are employed universally in the field of digital data transmission, this information can be converted to a serial readout, a parallel readout in binary coded decimal (BCD) form, or readout in parallel in the existent 1 out of 10 code.

The block diagram shows the manner in which the same circuitry would be used to generate digital information in order to provide the data needed to make an identification card, etc. Switch 42 is shown on the block diagram in the position for comparing a scanned palm with information obtained from a card reader. When switch 42 is actuated so that the control input 39 to the enable circuit 34 is connected to control line 40 coming from enable generator 38, the system will generate information from the palm to actuate a card printer or similar device. The way in which the system works in this mode is as follows: The video signal from the photodetector 23 is generated in the same way as above, with the system being actuated by actuator switch 15 in the same manner. The motor drive circuit is controlled in the same way by the clock pulses through divider 29. These clock pulses are also applied to counter 30, actuated by the reset command from divider 29.

The interconnections between the counter 30 and all of the card reader 32 connections and associated logic are not used at all in this mode of operation. Instead the output of the video amplifier and processor 26 (which was used as an input to the correlator 31 in the identification mode) is now fed into an enable generator 38 which provides an output synchronized with the system clock each time the video amplifier and processor 26 provides a leading or trailing pulse edge. Thus for each pulse edge generated by scanning the palm, a number is transferred from counter 30 through enable circuit 34 to parallel entry register 35. This number (which in the block diagram is in 1 out of 10 code but can be generated in any convenient code) identifies the time position of each of the leading and trailing edges of the identifying pulses generated from the scan of the palm. It is the time position of these leading and trailing edges that provide the identification of the palm, and therefore the system encoding technique must preserve the information showing this time position. In the technique described here, this time position is resolved into a part in a thousand by use of 3 decimal digits to define each leading and trailing edge. With slightly greater complexity, this system can have greater resolution and define the position of each leading and trailing edge to a part in 10,000 or even finer resolution merely by increasing the division ratio in block 29 (which is here shown as divide by 1,000) and adding an additional decade or more to blocks 30, 34, 35 and 36. (This will of course require that the card, the card reader, and the associated logic have the ability to handle the additional information.)

Used in this mode, the number defining the time position of each pulse edge is made available at the readout interface 36. By techniques known to the state-of-the-art, this information can be used to control any desired type of digital recording equipment such as a printer, a memory, or a card punch to provide the type of identification card which is discussed above.

APPLICATIONS Identification —

1. Moderate Security Identification—Check Cashing

For such applications as check cashing identifications where only moderate security is involved, the palm print unit is used to generate the code identification for a person, and this number punched on an ID card. Thereafter, a unit at any location is used to positively establish whether or not a person's palm pattern does in fact agree with the ID card he has presented. Time wasted in writing out identification information, such as driver's license numbers, would be eliminated. The whole procedure takes but a few seconds.

2. Replacement For Time Clock Punching

In a company that presently uses computerized payroll processing, time card punching can be completely eliminated by the system in accordance with the invention. The system eliminates the cost of handling time cards, putting them out at the beginning of each shift, and sorting them at the end, and reduces the time required to punch in and out. Further, it completely eliminates the possibility of one employee punching the time card of another.

Instead of a time clock, a palm print unit is used. Each employee has his palm scanned as he enters and leaves. The employee's number, with all associated time clock information, would automatically be entered onto magnetic tape in a form suitable for direct read-in to a computer. Such a procedure can, of course, be combined with identification for access to secure areas.

3. Maximum Security Identification

The procedure used in a maximum security situation is the same as that used for moderate security except for one additional provision: verification with a secure central file. In such a central file, additional information can be maintained about a person, such as the specific areas of authorized access. Machine communication with a central file would require only 1/10 second on a standard telephone line. One second later, a yes-no answer would be available. Short of modifying the information in central files, the system is foolproof. In simpler situations, a guard could read the code number to a clerk in central files for verification.

4. Transmission of Security Clearance

The present technique plugs a major gap in transmitting security clearances. Under today's procedures, clearance is often established by transmitting the name of a cleared person. It is possible to use someone else's security clearance merely by assuming his name. Transmitting the palm print identification number completely avoids this problem.

While there has been shown and described a preferred embodiment of a Palm Print Identification System, in accordance with the invention, it will be appreciated that many changes and modifications may be made therein without, however, departing from the essential spirit of the invention as defined in the annexed claims.

I claim:

1. A palm-print reader adapted to provide a numerical identification of an individual, comprising:
 a. optical means to form an image of the pattern of an individual palm print,
 b. means to scan said image to produce a video signal which is an analog of said pattern,
 c. electronic means to convert said analog signal into a digital code constituted by an array of numbers which is an index to said pattern, and
 d. means to record said code to provide said identification.

2. A reader as set forth in claim 1, wherein said optical means includes a prism whose hypotenuse is engageable by the palm, means disposed on one side of the prism to illuminate same and a lens system disposed on the other side of the prism to project the image of the palm print.

3. A reader as set forth in claim 2, further including means to constrain the hand to the area of said hypotenuse, said means including a row of guide pins disposed adjacent the upper margin of said area, the spaces between said pins being occupied by fingers of the hand.

4. A reader as set forth in claim 1, wherein said means to scan includes a rotating disc having a radial aperture therein and a photodetector mounted on said disc behind said aperture to intercept light and to produce said analog signal, said photodetector effecting a cyclical circular scan of said image.

5. A reader as set forth in claim 1, further including means to record said code on a card.

6. A palm print identification system comprising:
 a. a palm-print reader adapted to scan an optical image of an individual palm print to produce a video signal thereof that is converted into a code constituted by an array of numbers which is an index to said palm print, said code being recorded to provide an identification, and b. means to verify said identification including means to convert said code identification into a signal and to compare said signal with a video signal derived by scanning the palm print of the individual presenting said identification to determine whether they correspond.

7. A system as set forth in claim 6, wherein said code is recorded on a card.

8. A system as set forth in claim 7, wherein the code on said card is sensed to effect said conversion.

9. A system as set forth in claim 6, wherein said code is an array of ten numbers.